United States Patent [19]

Tiberg

[11] 3,819,361

[45] June 25, 1974

[54] METHOD OF SLAG SEPARATION

[75] Inventor: Magnus Gustav Georg Tiberg, Hallefors, Sweden

[73] Assignee: SKF Industrial Trading and Development Company N.V., Amsterdam, Netherlands

[22] Filed: Aug. 17, 1972

[21] Appl. No.: 281,346

[30] Foreign Application Priority Data

Aug. 24, 1971 Sweden ............ 10716/71

[52] U.S. Cl. ............ 75/13, 75/46, 75/61, 266/38, 210/222

[51] Int. Cl. ............ C21c 5/52

[58] Field of Search ............ 75/13, 46, 93 R, 24, 61; 266/37, 38; 13/10, 33; 417/50; 210/222

[56] References Cited

UNITED STATES PATENTS

| | | | |
|---|---|---|---|
| 3,316,075 | 4/1967 | Grady | 75/24 |
| 3,576,321 | 4/1971 | Faste | 75/13 |
| 3,713,639 | 1/1973 | Von Starck | 266/38 |
| 3,734,720 | 5/1973 | Von Starck et al. | 75/93 |

*Primary Examiner*—L. Dewayne Rutledge
*Assistant Examiner*—M. J. Andrews
*Attorney, Agent, or Firm*—Howson and Howson

[57] ABSTRACT

A method of separating slag from molten metal in a tiltable smelting or refining furnace having an inductive transport trough disposed at the discharge opening for the slag operable to effect flow of slag in one direction and repel flow of molten metal in said one direction consisting of the steps of tilting the furnace to a degree where the molten metal is slightly higher than the bottom of the inductive transport trough whereby only slag flows through the transport trough.

1 Claim, No Drawings

METHOD OF SLAG SEPARATION

The invention relates to metallurgical process technique, especially a method of preventing molten metal from escaping when separating the slag from the molten metal in a tiltable smelting or refining furnace. It is generally known in the field of steel making that the slag has to be separated from the molten metal and that it is essential that the separation may be carried out in a short time without temperature loss in the charge and that the amount of molten metal escaping with the slag is kept as small as possible.

In electric ore furnaces, the discharge of the slag is generally carried out by tilting the furnace to such a position that the slag starts flowing out through the escape opening for the slag, whereafter the discharge procedure is completed by raking out the remaining slag over the threshold of the escape opening. The raking takes place in order to prevent the steel from flowing out with the slag. The above described conventional method can be carried out rapidly and is especially suitable for small size furnaces, but when the furnaces are big and the weight of the charges increases, the method will take a longer time and the charge will be subjected to greater temperature losses.

The object of this invention is therefore to achieve a method in which the above mentioned raking of the slag is eliminated, the amount of metal escaping with the slag is diminished, the time for tapping the slag and the temperature loss of the charge is diminished, and the slag separation procedure is considerably simplified.

According to the invention, the above mentioned object is achieved by a method which is characterized by that an inductive transport which is characterized by an inductive transport trough known per se, the direction of action of which being opposite to the direction of discharge of the slag, is provided at the discharge opening for the slag, whereby the molten metal which possibly escapes is returned to the furnace while the slag is not affected and passes freely through the trough.

The above mentioned inductive transport trough has been used for pumping molten metal, especially in the foundry field, but the trough has hitherto not been used for restricting a metal flow in a slag separation process by reversing its direction of action.

The method according to the invention will now be described in detail.

According to the invention, an inductive transport trough is arranged at the discharge opening for the slag, i.e., the trough is built into the opening threshold of a smelting furnace, e.g., an electric ore furnace. The trough is thereby designed in such a manner that molten metal which comes into the trough is forced to move in a direction opposite to the discharge direction of the slag, which means that molten metal escaping with the slag is immediately fed back into the furnace by the inductive forces created by the inductive transport trough, while the slag, which is not affected by such forces, is freely passing through the trough.

When applying the method according to the invention on a 100 ton electric ore furnace, it is preferred that the trough has an inner width of 350 mm, a depth of 100 mm, and that the inductive force is adjusted so that a steel flow with a height of 20 mm may be forced back into the furnace.

The method according to the invention makes it possible to carry out the slag separation very quickly, and the furnace has only to be tilted so that the steel surface comes to the same level as or slightly higher than the bottom of the inductive transport trough, whereby the slag will flow out through the trough and possibly escaping molten metal is immediately returned into the furnace. The slag separation may therefore be carried out without the need of interrupting the smelting or heating procedure of the charge, which considerably increases the production capacity.

I claim:

1. A method of separating slag from molten metal in a tiltable smelting or refining furnace comprising the steps of providing a furnace containing molten metal and slag, disposing an inductive transport trough at the discharge opening for the slag operable to effect flow of slag in one direction out of the furnace and repel flow of molten metal in said one direction and tilting the furnace to a degree where the molten metal is slightly higher than the bottom of the inductive transport trough whereby only slag flows completely through the transport trough in said one direction.

* * * * *